United States Patent
Peri et al.

(10) Patent No.: US 12,432,443 B2
(45) Date of Patent: Sep. 30, 2025

(54) SYSTEM AND METHOD FOR DETECTING A USER INTENT TO START A VIDEO RECORDING

(71) Applicant: Samsung Electronics Co., Ltd., Suwon-si (KR)

(72) Inventors: Christopher Anthony Peri, Mountain View, CA (US); Ravindraraj Mamadgi, Fremont, CA (US); Yingen Xiong, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 52 days.

(21) Appl. No.: 18/304,235

(22) Filed: Apr. 20, 2023

(65) Prior Publication Data
US 2024/0073514 A1    Feb. 29, 2024

Related U.S. Application Data

(60) Provisional application No. 63/401,776, filed on Aug. 29, 2022.

(51) Int. Cl.
*H04N 23/60* (2023.01)
*G06T 7/246* (2017.01)
(Continued)

(52) U.S. Cl.
CPC ............. *H04N 23/64* (2023.01); *G06T 7/246* (2017.01); *G06T 7/73* (2017.01); *G06V 10/44* (2022.01);
(Continued)

(58) Field of Classification Search
CPC .... H04N 23/667; H04N 23/617; H04N 23/64; H04N 23/611; G06V 40/174;
(Continued)

(56) References Cited

U.S. PATENT DOCUMENTS

| | | |
|---|---|---|
| 9,307,143 B2 | 4/2016 | Sim et al. |
| 9,363,426 B2 | 6/2016 | Malkin et al. |

(Continued)

FOREIGN PATENT DOCUMENTS

| | | |
|---|---|---|
| CN | 112464012 B | 6/2022 |
| EP | 3822742 A1 | 5/2021 |

(Continued)

OTHER PUBLICATIONS

International Search Report and Written Opinion of the International Searching Authority dated Sep. 19, 2023 in connection with International Patent Application No. PCT/KR2023/008951, 10 pages.

(Continued)

*Primary Examiner* — Pritham D Prabhakher (57) ABSTRACT

A method includes, in response to initiating a shooting mode of a camera application on an electronic device, collecting sensor information comprising at least one of: motion data of the electronic device, position data of the electronic device, and image data captured by one or more imaging sensors of the electronic device, wherein the shooting mode represents at least one of: a video record mode and an image capture mode. The method also includes determining, using a trained machine learning model, whether a user intention is to record video or capture an image based on features extracted from the sensor information. The method further includes recording video regardless of the shooting mode in response to determining that the user intention is to record video or capturing the image regardless of the shooting mode in response to determining that the user intention is to capture the image.

20 Claims, 6 Drawing Sheets

(51) Int. Cl.
*G06T 7/73* (2017.01)
*G06V 10/44* (2022.01)
*G06V 10/70* (2022.01)
*G06V 40/16* (2022.01)
*G06V 40/20* (2022.01)

(52) U.S. Cl.
CPC ............ *G06V 10/70* (2022.01); *G06V 40/174* (2022.01); *G06V 40/23* (2022.01); *G06V 40/28* (2022.01); *G06T 2207/30201* (2013.01); *G06V 2201/07* (2022.01)

(58) Field of Classification Search
CPC ........ G06V 40/23; G06V 40/20; G06V 40/28; G06V 40/33; G06V 10/70; G06V 10/17; G06V 10/44; G06V 2201/07; G06T 7/246; G06T 7/73; G06T 2207/30201
USPC ...................................................... 348/222.1
See application file for complete search history.

(56) References Cited

U.S. PATENT DOCUMENTS

| | | | |
|---|---|---|---|
| 9,363,431 B2 * | 6/2016 | Rav-Acha | H04N 23/611 |
| 9,998,665 B2 | 6/2018 | Waltermann et al. | |
| 10,440,261 B2 | 10/2019 | Cheaz et al. | |
| 10,621,424 B2 | 4/2020 | Lin | |
| 10,778,888 B2 * | 9/2020 | Cheaz | H04M 1/72454 |
| 10,986,287 B2 | 4/2021 | Liu et al. | |
| 11,057,558 B2 * | 7/2021 | Tiwari | H04N 23/80 |
| 11,245,840 B2 | 2/2022 | Kelly et al. | |
| 11,301,052 B2 | 4/2022 | Huffman et al. | |
| 11,507,855 B2 | 11/2022 | Woiceshyn et al. | |
| 11,509,817 B2 * | 11/2022 | Gove | G06T 1/0007 |
| 11,606,493 B2 | 3/2023 | Mishra et al. | |
| 12,094,246 B1 * | 9/2024 | Bonnaffé | G06V 40/174 |
| 2012/0069141 A1 * | 3/2012 | Sim | H04N 23/64 348/36 |
| 2014/0333788 A1 | 11/2014 | Xiong et al. | |
| 2015/0281566 A1 * | 10/2015 | Rav-Acha | H04N 23/70 348/222.1 |
| 2015/0350505 A1 * | 12/2015 | Malkin | G03B 17/00 348/357 |
| 2016/0021311 A1 * | 1/2016 | Waltermann | H04N 23/45 348/262 |
| 2016/0127641 A1 * | 5/2016 | Gove | H04N 23/611 348/143 |
| 2019/0387159 A1 | 12/2019 | Cheaz et al. | |
| 2020/0014848 A1 | 1/2020 | Gove | |
| 2020/0213509 A1 * | 7/2020 | Tiwari | H04N 23/80 |
| 2020/0228692 A1 | 7/2020 | Wakamatsu et al. | |
| 2020/0267331 A1 * | 8/2020 | Liu | H04N 23/60 |
| 2020/0404160 A1 | 12/2020 | Luk et al. | |
| 2021/0042662 A1 | 2/2021 | Pu et al. | |
| 2021/0173489 A1 * | 6/2021 | Huffman | G06F 3/0346 |
| 2022/0121841 A1 | 4/2022 | Oh et al. | |
| 2022/0179665 A1 | 6/2022 | Rathod | |

FOREIGN PATENT DOCUMENTS

| | | |
|---|---|---|
| JP | 2002-10135 A | 1/2002 |
| JP | 2017509214 A | 3/2017 |
| KR | 10-2011-0060296 A | 6/2011 |
| KR | 10-2013-0110441 A | 10/2013 |
| KR | 10-1436322 B1 | 10/2014 |
| KR | 10-2022-0038488 A | 3/2022 |

OTHER PUBLICATIONS

Carter et al. "What is an AI camera? How AI is changing photography and photo editing . . . ", Digital Camera World, Jul. 2, 2021, 14 pages.

Supplementary European Search Report dated Jun. 26, 2025, in connection with European Application No. 23860628.9, 8 pages.

* cited by examiner

SYSTEM AND METHOD FOR DETECTING A USER INTENT TO START A VIDEO RECORDING

CROSS-REFERENCE TO RELATED APPLICATION AND PRIORITY CLAIM

This application claims priority under 35 U.S.C. § 119(e) to U.S. Provisional Patent Application No. 63/401,776 filed on Aug. 29, 2022, which is hereby incorporated by reference in its entirety.

TECHNICAL FIELD

This disclosure relates generally to imaging devices and processes. More specifically, this disclosure relates to a system and method for detecting a user intent to start a video recording.

BACKGROUND

Many electronic devices have sophisticated camera capabilities. However, as these capabilities expand and more options become available, the camera is becoming increasingly difficult for users to select and apply the correct tools and functionality. When trying to capture a specific moment, reviewing the tools and settings may cause the specific moments to pass without capture.

SUMMARY

This disclosure relates to a system and method for detecting a user intent to start a video recording.

In a first embodiment, a method includes, in response to initiating a shooting mode of a camera application on an electronic device, collecting sensor information comprising at least one of: motion data of the electronic device, position data of the electronic device, and image data captured by one or more imaging sensors of the electronic device, wherein the shooting mode represents at least one of: a video record mode and an image capture mode. The method also includes determining, using a trained machine learning model, whether a user intention is to record video or capture an image based on features extracted from the sensor information. The method further includes recording video regardless of the shooting mode in response to determining that the user intention is to record video or capturing the image regardless of the shooting mode in response to determining that the user intention is to capture the image.

In a second embodiment, an electronic device includes one or more imaging sensors and at least one processing device operably coupled to the one or more imaging sensors. The at least one processing device is configured to, in response to initiating a shooting mode of a camera application on an electronic device, collect sensor information comprising at least one of: motion data of the electronic device, position data of the electronic device, and image data captured by the one or more imaging sensors of the electronic device, wherein the shooting mode represents at least one of: a video record mode and an image capture mode. The at least one processing device is also configured to determine, using a trained machine learning model, whether a user intention is to record video or capture an image based on features extracted from the sensor information. The at least one processing device is further configured to record video regardless of the shooting mode in response to determining that the user intention is to record video or capturing the image regardless of the shooting mode in response to determining that the user intention is to capture the image.

In a third embodiment, a non-transitory machine readable medium contains instructions that when executed cause at least one processor of an electronic device to, in response to initiating a shooting mode of a camera application on the electronic device, collect sensor information comprising at least one of: motion data of the electronic device, position data of the electronic device, and image data captured by one or more imaging sensors of the electronic device, wherein the shooting mode represents at least one of: a video record mode and an image capture mode. The non-transitory machine readable medium further contains instructions that when executed cause the at least one processor to determine, using a trained machine learning model, whether a user intention is to record video or capture an image based on features extracted from the sensor information. The non-transitory machine readable medium further contains instructions that when executed cause the at least one processor to record video regardless of the shooting mode in response to determining that the user intention is to record video or capturing the image regardless of the shooting mode in response to determining that the user intention is to capture the image.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include any other electronic devices now known or later developed.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the descriptions in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 6, described below, and the various embodiments of this disclosure are described with reference to the accompanying drawings. However, it should be appreciated that this disclosure is not limited to these embodiments and all changes and/or equivalents or replacements thereto also belong to the scope of this disclosure.

As noted above, many electronic devices have sophisticated camera capabilities. However, as these capabilities expand and more options become available, the camera is becoming increasingly difficult for users to select and apply the correct tools and functionality. When trying to capture a specific moment, reviewing the tools and settings may cause the specific moments to pass without capture. A specific example is image and video capturing. For video capturing of an impromptu moment, navigating the user interface to start video capture needs to be performed quickly in order to avoid missing a part or all of the impromptu moment. Conversely, if a user intends to capture an image but previously captured a video, the user may discover that a video had been captured at a lower quality than the intended image would have been captured. While many user interfaces provide buttons for converting to other image capture settings and small text indicating the shooting mode of the camera, a user may have difficulty noticing the cues while trying to capture a moment.

Due to increasing functionality options and user interface complications of starting a video, users may end up missing the events that were intended to be captured. Also, some user interfaces can be poorly designed and confuse the user.

Embodiments of this disclosure provide a machine learning system that allows an electronic device to determine an intention of a user to start filming quickly with little to no user interaction with the user interface. A manual copy and a "smart" copy of images and video may be saved, allowing a user to choose a suitable capture after an event has passed in case the machine learning system is incorrect. A system can be implemented that identifies motions and positions of the electronic device to correlate a dataset that includes examples of electronic devices being used to capture images and videos. The machine learning system can use the dataset to determine a high correlation between current actions and known past actions of a user and determine an intended imaging mode of a camera.

Figure 1:
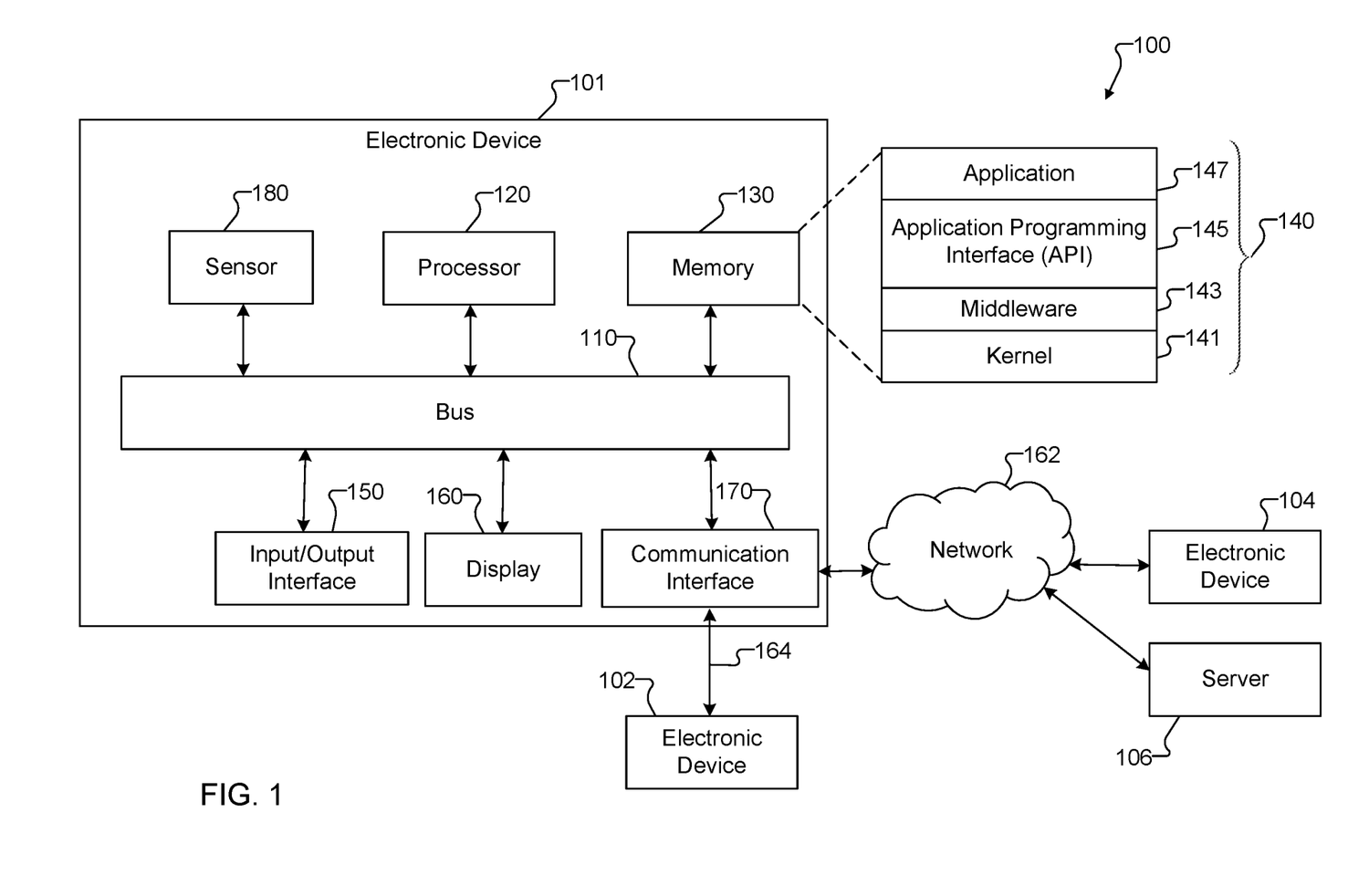
FIG. 1 illustrates an example network configuration including an electronic device in accordance with this disclosure.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, and a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more processing devices, such as one or more microprocessors, microcontrollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), or a graphics processor unit (GPU). The processor 120 is able to perform control on at least one of the other components of the electronic device 101 and/or perform an operation or data processing relating to communication or other functions. As described below, the processor 120 may detect a user intent to start a video recording with an electronic device, such as a hand-held phone, as described in more detail below.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may include one or more applications that, among other things, detect a user intent to start a video recording with an electronic device, such as a hand-held phone. These functions can be performed by a single application or by multiple applications that each carries out one or more of these functions.

The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The wireless communication is able to use at least one of, for example, long term evolution (LTE), long term evolution-advanced (LTE-A), $5^{th}$ generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, the sensor(s) 180 can include one or more cameras or other imaging sensors, which may be used to capture images of scenes. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. In some embodiments of this disclosure, the server 106 may detect a user intent to start a video recording with an electronic device, such as a handheld phone as described in more detail below.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
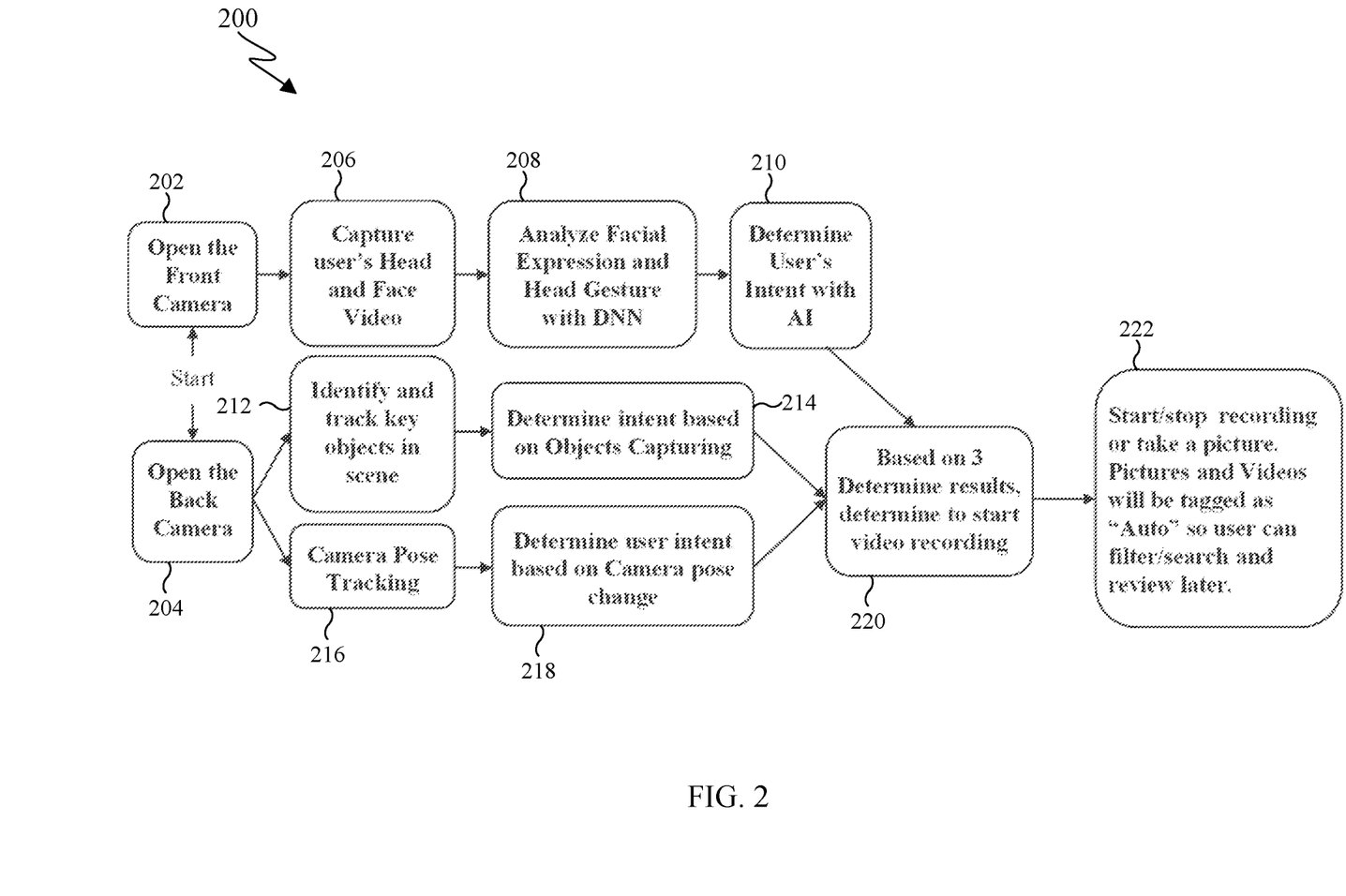
FIG. 2 illustrates an example pipeline for detecting user intent for a shooting mode of a camera application in accordance with this disclosure.

FIG. 2 illustrates an example pipeline 200 for detecting user intent for a shooting mode of a camera application in accordance with this disclosure. For ease of explanation, the pipeline 200 is described as being performed on or supported by the electronic device 101 in the network configuration 100 of FIG. 1, which may represent a cell phone or other hand-held device in some embodiments. However, the pipeline 200 shown in FIG. 2 could be used with any other suitable device(s) and in any other suitable system(s).

As shown in FIG. 2, a camera application can be opened on the electronic device 101, which causes a front-facing camera to open in operation 202 and a back-facing camera to open in operation 204. The camera application can have either the front-facing camera or the back-facing camera displayed by default or based on a previous use of the camera application. The back-facing camera is a camera located on a surface or side of the electronic device 101 that is opposite to the display. The front-facing camera is a camera located on a surface or side of the electronic device 101 that is the same as the display. While the following operations are described for capturing an image or video using the back-facing camera, similar functionality can be reversed when capturing an image or video using the front-facing camera.

The front-facing camera of the electronic device 101 can capture a user head and a user face in operation 206. The machine learning system can identify the user head and the user face in the frames captured by the back-facing camera. The captures of the user head and the user face can be continuously captured while the camera application is open, can be captured upon a selection of an input to record video or capture an image, or any other suitable timing for a capture. The captures of the user head and the user face can terminate based on completing a video recording or image capture or when the electronic device motion is great enough that the subjects are lost from the preview image or video. The user in various embodiments can be defined as a person using camera application on the electronic device 101.

The user head and user face can be analyzed for facial expressions and head gestures with a deep neural network (DNN) in operation 208. The user face and user head can be analyzed to identify specific features for use in determining user intent of a shooting mode. For example, the electronic device 101 can identify eye gaze, mouth features, etc. from the user face and identify head pose from the user head.

The electronic device 101 can perform a user determination for user intent in operation 210. The user determination for user intent can be performed with an artificial intelligence (AI). The AI can be trained for determining whether a user intends to record a video or capture an image based on the user face and the user head. Examples of determinations for user intent can include that the user is not ready for capturing video or images, that the user is intending to record video, and that the user is intending to capture an image. For example, the AI can determine that an amount of head movement over a threshold indicates that the user is not ready for recording video or capturing an image. The AI can also determine that the user intends to record video or capture an image based on a degree of eye movement or other facial expressions.

Using the back-facing camera, objects in the scene can be identified and tracked in operation 212. Objects in the scene are typically people but can also include cars, bikes, pets, etc. The objects can be identified by the electronic device 101 or selected by a user. In certain embodiments, the electronic device 101 can present objects in a user interface to the user for confirmation. A number of objects in the image to be identified and tracked can be specified, such as a maximum number of objects. Key objects can be determined based on a duration in the scene, such as a minimum amount of time or an amount of consecutive captured frames. The key objects can also be determined based on a presence within the scene when a camera application is opened.

The electronic device 101 can perform an object determination for user intent in operation 214. Based on the actions of these objects relative to the person holding the camera, a likelihood of the user intent for recording video or capturing images can be determined. For example, if one or more people are detected and are standing still while looking at the camera, the likelihood of a user intention for capturing an image may be greater than an image capturing threshold. However, if one or more people are detected and are moving in the scene, the likelihood of a user intention for recording video may be greater than a video recording threshold. The object determination of user intent for a shooting mode can be made heuristically or using machine learning.

Also when opening the back-facing camera, a camera pose of the back-facing camera can be tracked in operation 216. The camera pose can be tracked using the sensors of the electronic device 101 or using image analysis on the frames captured by the back-facing camera. For, example, the electronic device 101 can include gyroscopes, gravity sensors, acceleration sensors, GPS sensors, proximity sensors, etc. that can be used to track the camera pose. Image analysis can be used to detect whether a scene is moving while detected objects remain within the frame.

The electronic device 101 can perform a camera pose determination for user intent in operation 218. The camera pose can be used to determine the user intent based on relative motion of the camera or electronic device 101. For example, when the camera is still, a likelihood of the user intent can be an image capture. However, if the camera is moving over a jitter threshold then the user intent can be determined to be a video recording mode. The jitter threshold can differentiate between shaking movement and actual movement.

Based on the determinations of user intent, the electronic device 101 can determine an overall user intent of the camera shooting mode in operation 220. The overall determination can use one or more of the user determination, object determination, and the camera pose determination to determine an overall intention for a shooting mode of the camera. The user determination, object determination, and the camera pose determination can each have a normalized relative likelihood score that can be used to determine a camera shooting mode. In certain embodiments, the user determination, object determination, and the camera pose determination can each be weighted differently depending on machine learning and AI identifying different levels of importance for each of the determinations. The determination of user intent can also include determining settings of the identified shooting mode.

Based on the overall determination, the electronic device 101 can perform the determined shooting mode in operation 222. The determined shooting mode can be automatically performed once the overall determination has been completed. When the determined shooting mode is not a current shooting mode of the camera application, the determined shooting mode can be utilized in addition to the current shooting mode. For example, when a video recording shooting mode is determined while in the image capturing mode, the camera application can capture an image and automatically begin recording video. While in the image capturing mode, the recorded video can be saved in a separate folder for automatic video recordings and image captures. The automatically recorded videos and captured images can also have information indicating that the video or image was automatically captured stored as metadata of the file. In certain embodiments, the camera application can provide a prompt on the display regarding the shooting mode of the user intent. The image capturing or video recording can also be performed using the camera settings determined based on the overall determination in operation 220.

Although FIG. 2 illustrates one example pipeline 200 for detecting user intent for a shooting mode of a camera application, various changes may be made to FIG. 2. For example, while shown as a series of operations, various operations in FIG. 2 may overlap, occur in parallel, occur in a different order, or occur any number of times.

Figure 3:
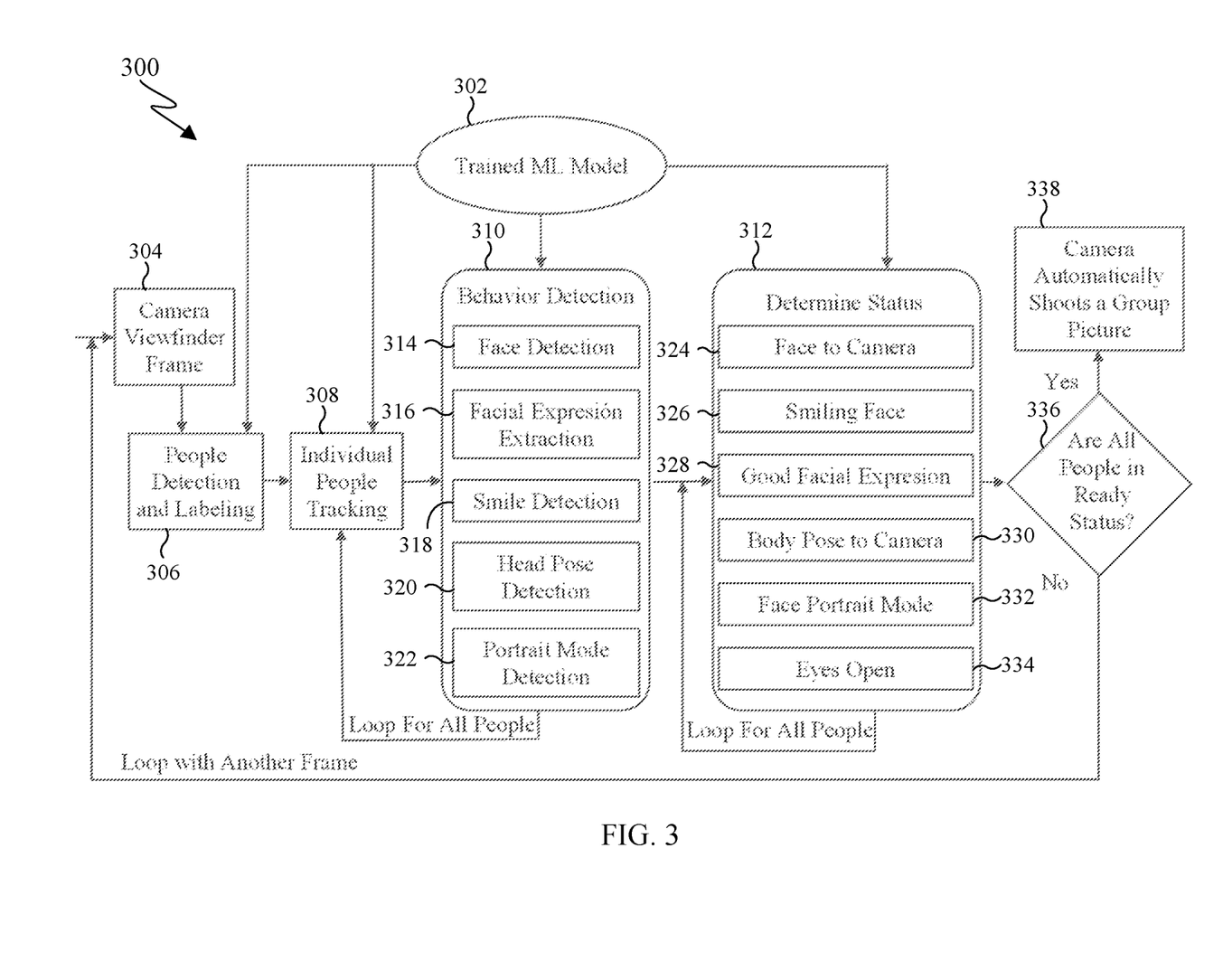
FIG. 3 illustrates an example process for automatically capturing an optimal moment to shoot a group photo in accordance with this disclosure.

FIG. 3 illustrates an example process 300 for automatically capturing an optimal moment to shoot a group photo in accordance with this disclosure. For ease of explanation, the process 300 is described as being performed on or supported by the electronic device 101 in the network configuration 100 of FIG. 1, which may represent a cell phone or other hand-held device in some embodiments. However, the process 300 shown in FIG. 3 could be used with any other suitable device(s) and in any other suitable system(s).

As shown in FIG. 3, the electronic device 101 can determine when to automatically capture a photo or record a video based on a facial expression, a pose, etc. using a machine learning model 302. Usually, when taking a photo for a group of people or a family, everyone faces the camera with a smiling face and open eyes. The ability for a user to perfectly time an image capture with these features can be difficult, especially as a number of people in the image increases. Therefore, the machine learning model 302 can be trained to identify these features along with other features in order to automatically capture an image. The machine learning model 302 can be trained using prepared data sets and be updated based on currently captured images.

One or more camera viewfinder frames 304 can be received by the electronic device 101. The viewfinder frame 304 can be received from one or more optical sensors in the electronic device 101. The viewfinder frame 304 can be initialized when a camera application is opened on the electronic device 101. The viewfinder frame 304 can also be referred to as a preview image or a preview image feed.

People detection and labeling operation 306 can be performed using the machine learning model 302. This may include, for example, the processor 120 of the electronic device 101, using the machine learning model 302, identifying people in the viewfinder frame. The identification of people can be performed using any person identification method(s). Each person in the identified people can be separately labeled in the image using the machine learning model 302.

Once identified and labeled, people tracking operation 308 can be performed using the machine learning model 302. This may include, for example, the processor of the electronic device 101, using the machine learning model 302, tracking each person simultaneously or in a determined order. In certain embodiments, an individual can be tracked as soon as the individual is identified and labeled while other individuals are still being detected and labeled. For instance, the machine learning model 302 can be used to detect and identify a user that is closer to the camera more quickly than a person that is further away in the scene. In certain embodiments, the tracked people can be selected or unselected by a user on the display of the electronic device 101.

Behavior detection operations 310 can be performed using the machine learning model 302, by the processor 120 of the electronic device 101, for example, for each person that is tracked in the people tracking operation 308. The behavior detection operation 310 can include a face detection operation 314, a facial expression detection operation 316, a smile detection operation 318, a head pose detection operation 320, a portrait mode detection operation 322, etc. The machine learning model 302 can be used to perform one or more of the detection operations 314-322. The behavior detection operation 310 is performed for each user being tracked from the people tracking operation 308. Operations 306-310 can be performed with as part of or simultaneously with operation 212.

The machine learning model 302 can be used to identify a user face in the face detection operation 314. The face detection operation 314 can be performed using a face detection algorithm. This may include, for example, the processor 120 of the electronic device 101, using the machine learning model 302, identifying whether facial features are visible in the viewfinder frame 304 for the specified user.

Facial expression detection operation 316 can be performed using the machine learning model 302 upon detecting the face in the face detection operation 314. When the face is not detected, the machine learning model 302 can skip the facial expression detection operation 316. The facial expression detection operation 316 can identify a facial expression based on detected eyes, checks, nose, etc. The facial expression detection operation 316 can be performed using any suitable facial detection or extraction algorithm.

The smile detection operation 318 can be performed using the machine learning model 302 to identify a structure of a user mouth. This may include, for example, the processor 120 of the electronic device 101, using the machine learning model 302, identifying a mouth based on a location on a face. When the face is not detected, the machine learning model 302 can skip the smile detection operation 318.

Head pose detection operation 320 can be performed using the machine learning model to determine a pose of the head. The head pose detection operation 320 can be performed prior to the face detection operation 314. If the head pose detection operation 320 determines that the head pose is facing away from the camera, the face detection operation 314 can be skipped by the machine learning model 302.

The portrait mode detection operation 322 can be performed after the head pose detection operation 320 is performed. This may include, for example, the processor 120 of the electronic device 101, using the machine learning model 302, detecting a portrait mode based on a body of user not being within the viewfinder frame 304 or based on only the face being within the viewfinder frame 304. The portrait mode detection operation 322 can be skipped based on not detecting a face in the face detection operation 314.

The machine learning model 302 can also be used, by the processor 120 of the electronic device 101, for example, to perform a status determination operation 312 for each person after the behavior detection operation 310 is completed. The status determination operation 312 can be performed for each person as the behavior detection operation 310 is completed for a specific person or can be performed after the behavior detection operation 310 has been completed for all people being tracked. The status determination operation 312 can include a face to camera determination operation 324, a smiling face determination operation 326, a good facial expression determination operation 328, a body pose to camera determination operation 330, a face portrait mode determination operation 332, and an eyes open determination operation 334.

The face to camera determination operation 324 can be performed using the machine learning model 302 to determine whether a user is facing the camera. Using the machine learning model 302 the information detected in the head pose detection operation 320 and the face detection operation 314 can be utilized to determine whether the user is facing the camera. When the head pose detection operation 320 does not detect a head pose that is facing the camera or when the face detection operation 314 does not detect a face, the face to camera determination operation 324 can be used to determine that a user is not ready for an image to be captured.

The smiling face determination operation 326 can be performed using the machine learning model 302 to determine whether a user is smiling. The machine learning model 302 can utilize the information detected in the head pose detection operation 320, the face detection operation 314, and smile detection operation 318 to determine that the user is smiling. The smiling face determination operation 326 can be skipped when the user is not determined to be facing the camera in the face to camera determination operation 324. When a user is determined to be smiling, the machine learning model 302 can determine that the user is ready to have an image captured. When the user is not smiling, the machine learning model 302 can be used to determine that the user is not ready or use other determinations 328-334 to determine whether the user is ready for the picture.

The good facial expression determination operation 328 can be performed using the machine learning model 302 to determine wither a user has a good facial expression. The machine learning model 302 can utilize the information detected in the head pose detection operation 320, the face detection operation 314, and the facial expression detection operation 316 to determine whether the facial expression of the tracked person indicates that the person is ready for an image to be captured. The good facial expression determination operation 328 can be skipped if the user is not determined to be facing the camera in the face to camera determination operation 324. When a user is determined to have a good facial expression, the machine learning model 302 can be used to determine that the user is ready to have an image captured. When the user does not have a good facial expression, the machine learning model 302 can be used to determine that the user is not ready or other determination operations 328-334 can be used to determine whether the user is ready for the picture. For example, if the user has an angry or sad facial expression, the machine learning model 302 can be used to determine that a user is not ready for an image to be captured.

The body pose to camera determination operation 330 can be performed using the machine learning model 302 to determine whether a body pose indicates readiness for an image to be captured. The machine learning model 302 can be used to determine whether a user has a body pose facing the camera. When the body pose of the user is facing away from the camera, the machine learning model 302 can determine that a user may not be ready for a picture. In certain embodiments, the body pose to camera determination and the face to camera determination operation 324 can be jointly used as an initial determination before performing detection operations 326, 328, 332, and 334. The face to camera determination operation 324 can be weighted over the body pose to camera determination operation 330 when the face to camera determination identifies that a user is facing the camera. The body pose to camera determination operation 330 can be skipped when the user is identified as facing the camera in the face to camera determination operation 324.

The face portrait mode determination operation 332 can be performed using the machine learning model 302 to determine whether a face portrait mode is suitable. The machine learning model 302 can be used to utilize the information detected in the head pose detection operation 320, the face detection operation 314, and the portrait mode detection operation 322. The face portrait mode determination operation 332 can be skipped when the face to camera determination operation 324 does not identify that the face of the user is directed at the camera. The face portrait mode determination operation 332 can identify that the user is ready for a picture when only the user face or a user body below the shoulder is not visible in the viewfinder frame 304.

The eyes open determination operation 334 can be performed using the machine learning model 302 to determine whether a tracked person has their eyes open. The machine learning model 302 can utilize the information detected in the portrait mode detection operation 322 and the face detection operation 314. The eyes open determination operation 334 can be skipped when the user is determined to be facing away from the camera in the face to camera determination operation 324. The machine learning model 302 can also be used to determine that user is not ready for an image to be captured based on the eyes being closed. When the eyes of the person are open, the machine learning model 302 can be used to determine that the user may be ready based on other determinations.

The machine learning model 302 can be used, such as by the processor 120 of the electronic device 101, for example, to perform a readiness determination operation 336 after one or more tracked people have been determined to be ready for an image capture. Ideally, the machine learning model 302 is used to capture an image when the entire group of tracked people in the viewfinder frame 304 are ready or continues the people tracking operation 308, behavior detection operation 310, and status determination operation 312 for each person until a picture is captured or the camera application is closed. However, the machine learning model 302 can be used to capture one or more images based on a threshold of people being ready. For example, some people do not smile or do not have happy expressions when taking pictures. For a large group of people with one or two people not smiling or having happy expressions, the machine learning model 302 could determine that taking a picture is suitable. The determination can be performed multiple times for a group.

The electronic device 101 can perform an automatic capture operation 338 upon determining that all people are ready. When the machine learning model 302 determines that the tracked users are ready for a picture, an image is automatically captured by the camera. When a portion of people are ready for the pictures, the tracked people that were not ready can be identified in the picture for a user to manually determine whether a specified user is ready. For example, when a user does not normally smile or have a generally happy face, the picture can still be captured and the user can determine whether to keep the picture. Multiple images can be captured for each determination that a group is ready.

Although FIG. 3 illustrates an example process 300 for automatically capturing an optimal moment to shoot a group photo, various changes may be made to FIG. 3. For example, while shown as a series of operations, various operations in FIG. 3 may overlap, occur in parallel, occur in a different order, or occur any number of times.

Figure 4:
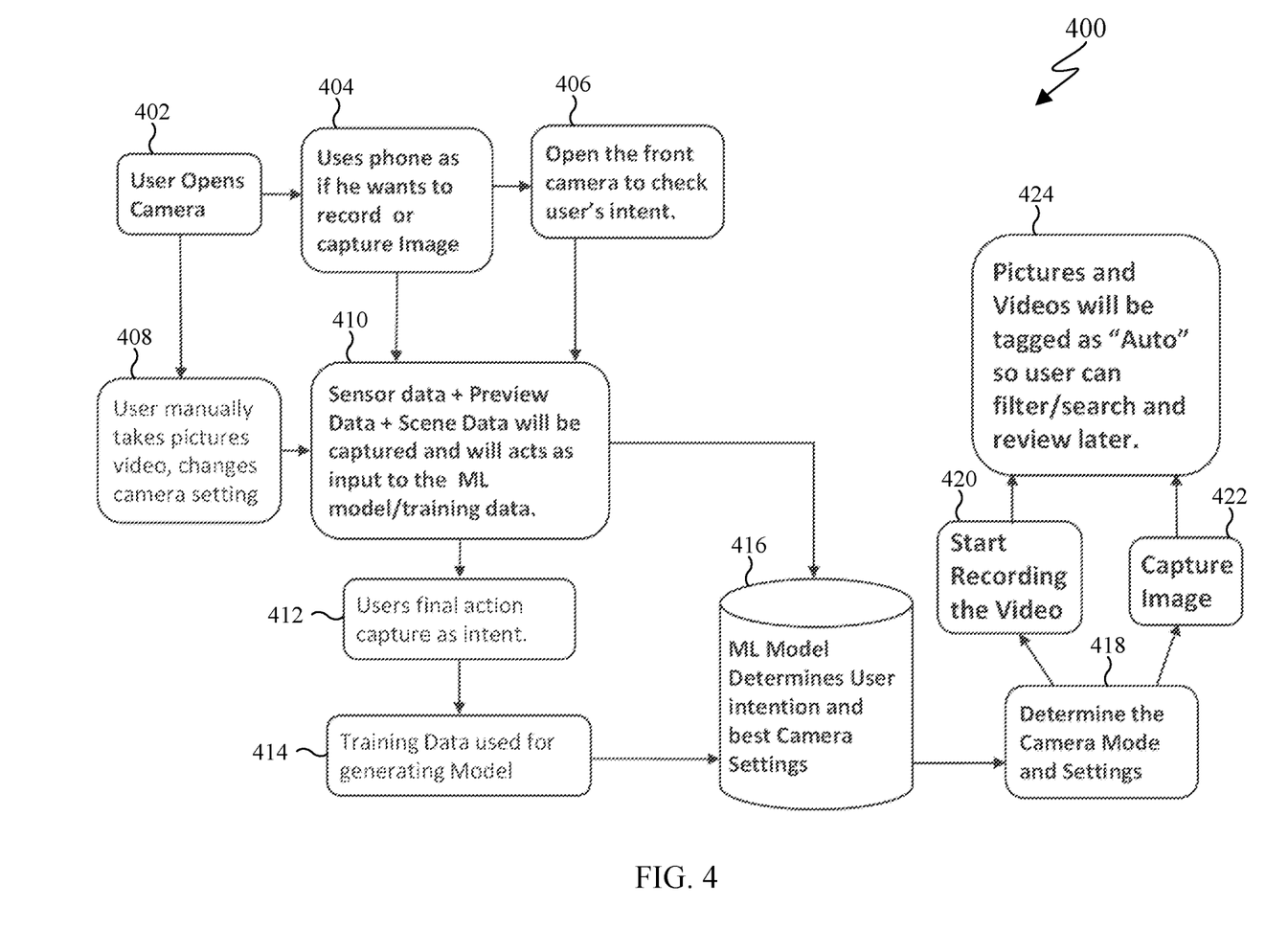
FIG. 4 illustrates an example process for training a machine learning model to determine a user intention of a shooting mode in accordance with this disclosure.

FIG. 4 illustrates an example process 400 for training a machine learning model to determine a user intention of a shooting mode in accordance with this disclosure. For ease of explanation, the process 400 is described as being performed on or supported by the electronic device 101 in the network configuration 100 of FIG. 1, which may represent a cell phone or other hand-held device in some embodiments. However, the process 400 shown in FIG. 4 could be used with any other suitable device(s) and in any other suitable system(s).

As shown in FIG. 4, the machine learning model 302 can be trained to determine a suitable shooting mode based on user intent. Using the machine learning model 302, the electronic device 101 can detect a user opening a camera application on the electronic device 101 in operation 402. The camera application can open one or more cameras including a front-facing camera and a back-facing camera. The camera application can have either the front-facing camera or the back-facing camera displayed by default or based on a previous use of the camera application. The back-facing camera is a camera located on a surface or side of the electronic device 101 that is opposite to the display. The front-facing camera is a camera located on a surface or side of the electronic device 101 that is the same as the display. While the following operations are described for capturing an image or video using the back-facing camera, similar functionality can be reversed when capturing an image or video using the front-facing camera.

The machine learning model 302 can be used to identify a current shooting mode of the camera in operation 404. The shooting mode can be tracked by the machine learning model when changed as a strong indicator that the user actually intends to use the specified shooting mode. The shooting modes can include an image capture mode and a video recording mode.

The machine learning model 302 can also be used to access information of the front-facing camera or control the front facing camera to capture images of the user operating the camera application on the electronic device in operation 406. The frames from the front-facing camera can be saved or removed after the image capture or video recording is completed.

The user of the camera application on the electronic device 101 can manually take pictures, changes settings, etc. in operation 408. The machine learning model 302 can be used to track the capture of the pictures and recording of the videos. The settings of the camera application can also be tracked by the machine learning model 302.

The data captured in operations 404-408 can be used as an input to the machine learning model 302 in operation 410. Additional sensor data from the electronic device 101 can be used including location data, proximity data, pose data, movement data, etc. The data input to the machine learning model 302 can be used to train the machine learning model 302 for identifying user intent for a shooting mode.

The final actions of the user can be captured for the user intent determination and machine learning model training in operation 412. For example, the user deleting a photo and subsequently recording a video can indicate that the input information is indicating a video recording mode was intended by the user due to the photo being deleted.

The training data can be stored and utilized for training the machine learning model 302 in operation 414. The training data can be captured by a large number of devices. Each device can be stored specifically or jointly with another device. For example, the group of devices can be used as initial training data and a specific user or group of users can be used as specific training data associated with the specific user or group of users.

The machine learning model 302 uses the training data to determine user intention and best camera settings for a camera application in operation 416. The machine learning model 302 can use the training data for determining data for the operations 206, 208, 212, and 216 and the determinations in operations 210, 214, 218, and 220 shown in FIG. 2. The machine learning model 302 can use the input information to develop features to detect in the behavior detection operation 310 and to analyze in the status determination operation 312 shown in FIG. 3. The machine learning model can apply weights to each of the detection operations 314-322 and the determinations 324-334 for the determination of whether each person in an image is ready for the picture to be captured.

The machine learning model 302 can be used to identify an intended shooting mode for a current use of a camera application in operation 418. The machine learning model 302 can also be used to perform or support performance of operations 202-220 when a camera application is opened on the electronic device 101. Based on the training from operation 416, the machine learning model 302 can be used to determine whether to operate the camera application in a video recording mode or an image shooting mode.

When the machine learning model 302 provides a determination that the user intends a video recording mode, the camera application is controlled to start recording a video in operation 420. The video can be recorded regardless of the current mode of the camera application. For example, the camera application can be opened in an image capturing mode and the determination can either switch to the shooting mode for the display or automatically record the video regardless of being in the image capturing mode. In certain embodiments, a notification can be provided to indicate that a video is being recorded automatically.

When the machine learning model 302 provides a determination that the user intends an image capturing mode, the camera application is controlled to capture an image in operation 422. The image can be captured regardless of the current shooting mode of the camera application. For example, while the user controlling the camera in video mode, the camera application can capture one or more images when the people identified in the image are determined to be ready or when the user input the record button. The machine learning model 302 can be used to determine that the users are ready for the image based on readiness determination operation 336.

The recorded video from operation 420 and the captured image from operation 422 can be stored with an "auto" tag in operation 424. The "auto" tag can allow a user to review the automatically recorded video and captured images quicker if stored with user captured video and images. When in the image shooting mode, the automatically record video can be stored on the electronic device 101 with the image captured by the user. When in the video recording mode, the automatically captured image(s) can be saved in addition to the video being captured by the user.

Although FIG. 4 illustrates an example process 400 for training a machine learning model to determine a user intention for a shooting mode, various changes may be made to FIG. 4. For example, while shown as a series of operations, various operations in FIG. 4 may overlap, occur in parallel, occur in a different order, or occur any number of times.

Figure 5:
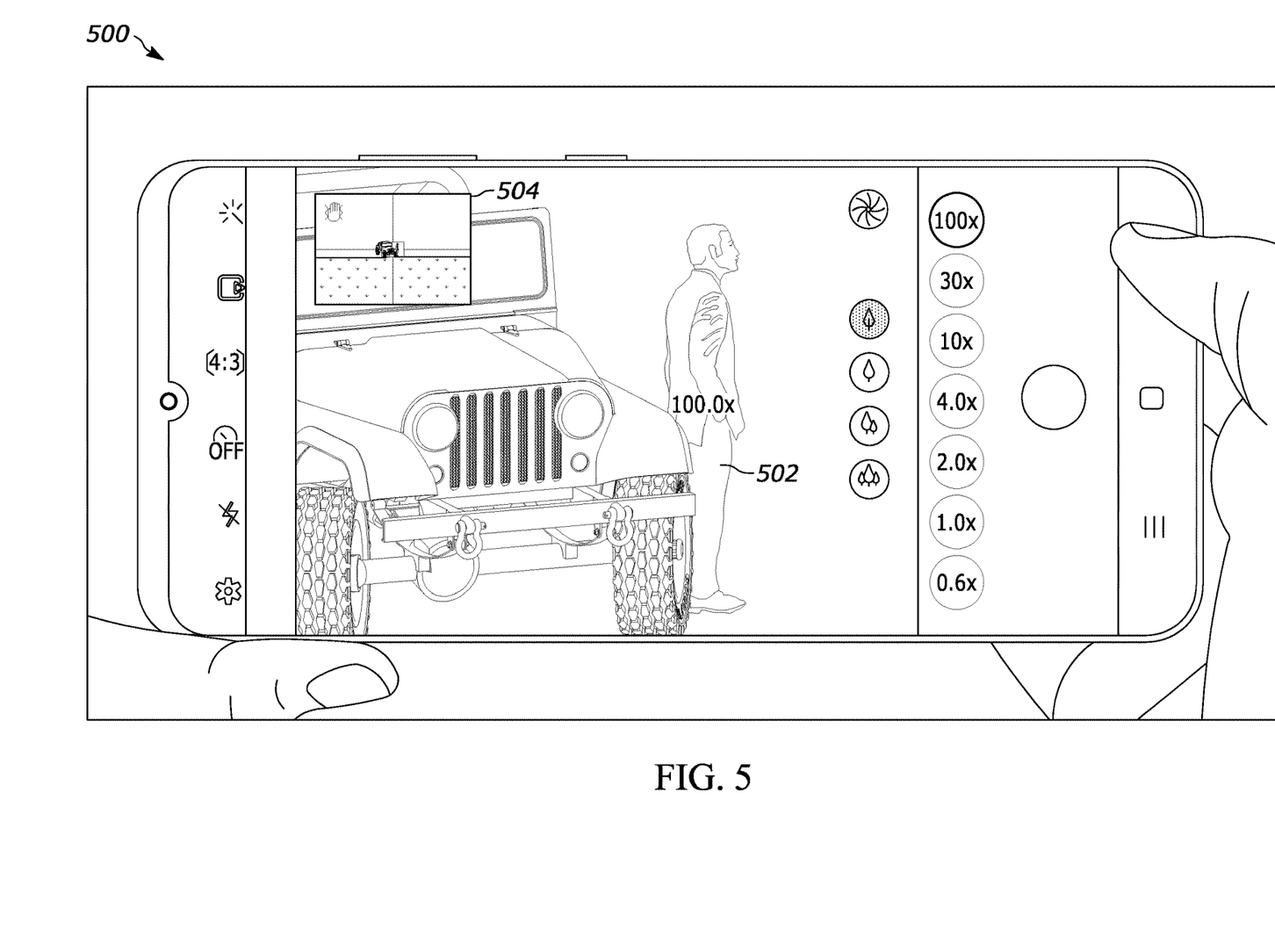
FIG. 5 illustrates an example user interface for detecting user intent for a shooting mode of a camera application in accordance with this disclosure.

FIG. 5 illustrates an example user interface 500 for detecting user intent for a shooting mode of a camera application in accordance with this disclosure. For ease of explanation, the user interface is described as being provided on the electronic device 101 in the network configuration 100 of FIG. 1, such as on the display 160 of the electronic device 101. However, the user interface 500 shown in FIG. 5 could be used with any other suitable device(s) and in any other suitable system(s).

As shown in FIG. 5, the user interface 500 can open in an image capturing mode for a camera application. A viewfinder or preview image 502 can be displayed on the user interface 500. The machine learning model 302 can be used to determine that an image is intended to be captured by the user. The camera application can automatically capture an image 504 corresponding to the preview image 502 shown on the user interface 500 in response to the determination that a photo is intended to be captured. The objects in the scene can be determined based on being currently displayed in the current preview image 502. As shown in the preview image 502, the user is zoomed in on the objects (e.g. person and car) in the scene. The machine learning model 302 can be used to determine that the zoomed in preview image and other current settings are suitable for the automatically captured image 504. However, the machine learning model 302 can determine that the user intends to capture the scene with a lower zoom value and correspondingly captures the image at different settings for the capture image 504 than currently utilized for the preview image 502.

Although FIG. 5 illustrates an example user interface 500 for detecting user intent for a shooting mode of a camera application, various changes may be made to FIG. 5. For example, the user interface 500 may be implemented on a different electronic device, such as a headset, a camera, etc. Also, the arrangement of the automatically-captured image 504 may be displayed on different portions of the user interface 500 and may not be displayed until the image is actually captured.

Figure 6:
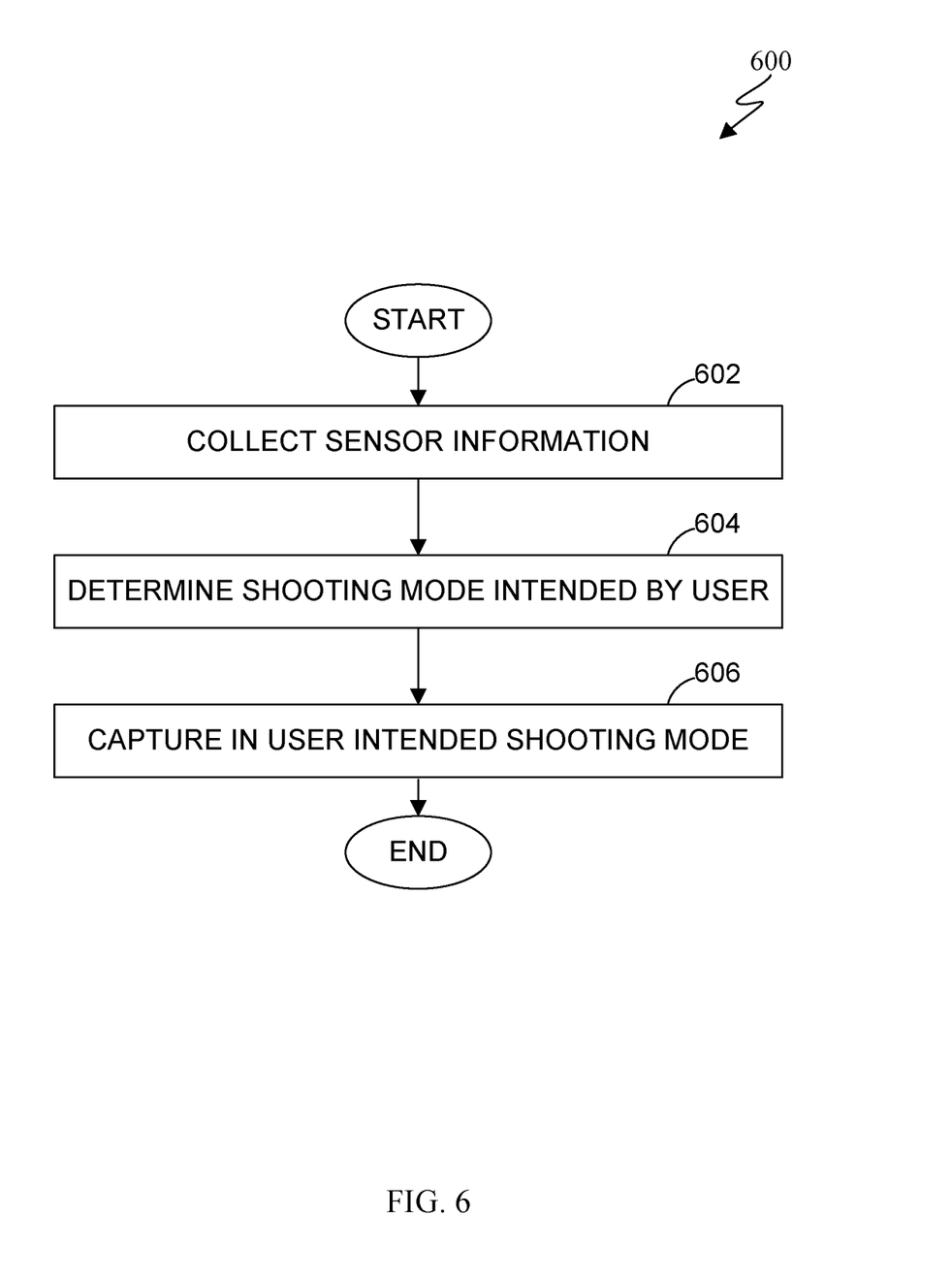
FIG. 6 illustrates an example method for detecting a user intent to start a video recording with an electronic device according to this disclosure.

FIG. 6 illustrates an example method 600 for detecting a user intent to start a video recording with an electronic device according to this disclosure. For ease of explanation, the method 600 of FIG. 6 is described as being performed on or supported by the electronic device 101 of FIG. 1. However, the method 600 shown in FIG. 6 could be used with any other suitable device(s) and in any other suitable system(s).

As shown in FIG. 6, the electronic device 101 collects sensors information at step 602. The sensor information can be collected in response to initiating a shooting mode of a camera application of an electronic device, such as a cell phone or camera. The sensor information can include motion data of the electronic device, position data of the electronic device, image data captured by one or more imaging sensors. The shooting mode represents at least one of a video record mode and an image capture mode. The image data can be captured using a front-facing imaging sensor or front-facing camera and a back-facing image sensor or a back-facing camera. The features extracted from the sensor information can include at least one of a facial expression, a head motion, a hand gesture, a body gesture, an object identity, a location, a motion of one or more key objects in the image data, etc. The features extracted from the sensor information can also include a pose of the electronic device, and motion data of the electronic device.

The electronic device 101 determines a shooting mode intended by the user at step 604. The electronic device 101 can determine whether a user intention is to record video or capture an image based on features extracted from the sensor information. The user intention can be determined using a trained machine learning model, such as the trained machine learning model 302. The determination of the shooting mode can be an overall determination that takes a user determination, an object determination, and a camera pose determination into consideration. The user determination can determine whether a user operating a camera of the electronic device 101 intends to record a video or capture an image. The object determination can determine whether objects in the scene are ready to be video recorded or captured in an image. The camera pose determination can determine whether to capture an image or record a video based on movement and orientation of a camera on the electronic device 101.

The electronic device 101 captures an image or video in a user-intended shooting mode at step 606. The video can be recorded regardless of a shooting mode in response to determining that the user intention is to record video. The image can be captured regardless of the shooting mode in response to determining that the user intention is to capture an image. The image or video can be automatically captured when the machine learning model 302 identifies when people in the preview image are ready to be photographed or video recorded.

Although FIG. 6 illustrates one example of a method 600 for detecting a user intent to start a video recording with an electronic device, various changes may be made to FIG. 6. For example, while shown as a series of steps, various steps in FIG. 6 may overlap, occur in parallel, occur in a different order, or occur any number of times.

Although this disclosure has been described with example embodiments, various changes and modifications may be suggested to one skilled in the art. It is intended that this disclosure encompass such changes and modifications as fall within the scope of the appended claims.

What is claimed is:

1. A method comprising:
in response to initiating a shooting mode of a camera application on an electronic device, collecting sensor information comprising at least one of:
motion data of the electronic device;
position data of the electronic device; and
image data captured by one or more imaging sensors of the electronic device,
wherein the shooting mode represents at least one of a video record mode and an image capture mode;
determining, using a trained machine learning model, whether a user intention is to record video or capture an image based on features extracted from the sensor information, wherein the trained machine learning model applies different weights to the features extracted from the sensor information according to one or more importance levels;

automatically, based on the determined user intention, recording video regardless of the shooting mode in response to determining that the user intention is to record video or capturing the image regardless of the shooting mode in response to determining that the user intention is to capture the image; and storing the recorded video or the captured image with a tag indicting the recorded video or the captured image was recorded or captured automatically by the camera application and to enable searching of automatically recorded or captured videos or images.

2. The method of claim 1, wherein:
the image data is captured using a front-facing imaging sensor of the electronic device; and
the features extracted from the sensor information comprise at least one of a facial expression, a head motion, a hand gesture, and a body gesture of a user.

3. The method of claim 1, wherein:
the image data is captured using a back-facing imaging sensor of the electronic device; and
the features extracted from the sensor information comprise at least one of an object identity, a location, and a motion of one or more key objects in the image data.

4. The method of claim 1, wherein the features extracted from the sensor information comprise (i) a pose of the electronic device based on the position data of the electronic device and (ii) the motion data of the electronic device.

5. The method of claim 1, further comprising:
detecting one or more people within a field of view of the one or more imaging sensors;
for each detected person, determining whether the person is ready for the image to be captured; and
in response to determining that each detected person is ready for the image to be captured, capturing the image regardless of the shooting mode.

6. The method of claim 5, wherein determining whether the person is ready for the image to be captured is based on at least one of a facial expression, a head motion, a hand gesture, and a body gesture of the person.

7. The method of claim 6, wherein the person is determined to be ready for the image to be captured based on at least one of a face of the person being directed towards the one or more imaging sensors, a body of the person being directed towards the one or more imaging sensors, the face of the person making a desired facial expression, and eyes of the person being opened.

8. An electronic device comprising:
one or more imaging sensors; and
at least one processing device operably coupled to the one or more imaging sensors, the at least one processing device configured to:
in response to initiating a shooting mode of a camera application on the electronic device, collect sensor information comprising at least one of:
motion data of the electronic device;
position data of the electronic device; and
image data captured by the one or more imaging sensors of the electronic device,
wherein the shooting mode represents at least one of a video record mode and an image capture mode;
determine, using a trained machine learning model, whether a user intention is to record video or capture an image based on features extracted from the sensor information, wherein the trained machine learning model applies different weights to the features extracted from the sensor information according to one or more importance levels;

automatically, based on the determined user intention, record video regardless of the shooting mode in response to determining that the user intention is to record video or capturing the image regardless of the shooting mode in response to determining that the user intention is to capture the image; and store the recorded video or the captured image with a tag indicting the recorded video or the captured image was recorded or captured automatically by the camera application and to enable searching of automatically recorded or captured videos or images.

9. The electronic device of claim 8, wherein:
the one or more imaging sensors includes a front-facing imaging sensor;
the image data is captured using the front-facing imaging sensor; and
the features extracted from the sensor information comprise at least one of a facial expression, a head motion, a hand gesture, and a body gesture of a user.

10. The electronic device of claim 8, wherein:
the one or more imaging sensors includes a back-facing imaging sensor;
the image data is captured using the back-facing imaging sensor; and
the features extracted from the sensor information comprise at least one of an object identity, a location, and a motion of one or more key objects in the image data.

11. The electronic device of claim 8, wherein the features extracted from the sensor information comprise (i) a pose of the electronic device based on the position data of the electronic device and (ii) the motion data of the electronic device.

12. The electronic device of claim 8, wherein the at least one processing device is configured to:
detect one or more people within a field of view of the one or more imaging sensors;
for each detected person, determine whether the person is ready for the image to be captured; and
in response to determining that each detected person is ready for the image to be captured, capture the image regardless of the shooting mode.

13. The electronic device of claim 12, wherein to determine whether the person is ready for the image to be captured is based on at least one of a facial expression, a head motion, a hand gesture, and a body gesture of the person.

14. The electronic device of claim 13, wherein the person is determined to be ready for the image to be captured based on at least one of a face of the person being directed towards the one or more imaging sensors, a body of the person being directed towards the one or more imaging sensors, the face of the person making a desired facial expression, and eyes of the person being opened.

15. A non-transitory machine readable medium containing instructions that when executed cause at least one processor of an electronic device to:
in response to initiating a shooting mode of a camera application on the electronic device, collect sensor information comprising at least one of:
motion data of the electronic device;
position data of the electronic device; and
image data captured by one or more imaging sensors of the electronic device,
wherein the shooting mode represents at least one of a video record mode and an image capture mode;

determine, using a trained machine learning model, whether a user intention is to record video or capture an image based on features extracted from the sensor information, wherein the trained machine learning model applies different weights to the features extracted from the sensor information according to one or more importance levels;

automatically, based on the determined user intention, record video regardless of the shooting mode in response to determining that the user intention is to record video or capturing the image regardless of the shooting mode in response to determining that the user intention is to capture the image; and store the recorded video or the captured image with a tag indicting the recorded video or the captured image was recorded or captured automatically by the camera application and to enable searching of automatically recorded or captured videos or images.

16. The non-transitory machine readable medium of claim 15, wherein:

the image data is captured using a front-facing imaging sensor of the electronic device; and the features extracted from the sensor information comprise at least one of a facial expression, a head motion, a hand gesture, and a body gesture of a user.

17. The non-transitory machine readable medium of claim 15, wherein:

the image data is captured using a back-facing imaging sensor of the electronic device; and the features extracted from the sensor information comprise at least one of an object identity, a location, and a motion of one or more key objects in the image data.

18. The non-transitory machine readable medium of claim 15, wherein the features extracted from the sensor information comprise (i) a pose of the electronic device based on the position data of the electronic device and (ii) the motion data of the electronic device.

19. The non-transitory machine readable medium of claim 15, further containing instructions that when executed cause the at least one processor to:

detect one or more people within a field of view of the one or more imaging sensors;

for each detected person, determine whether the person is ready for the image to be captured; and in response to determining that each detected person is ready for the image to be captured, capture the image regardless of the shooting mode.

20. The non-transitory machine readable medium of claim 19, wherein:

determining whether the person is ready for the image to be captured is based on at least one of a facial expression, a head motion, a hand gesture, and a body gesture of the person; and the person is determined to be ready for the image to be captured based on at least one of a face of the person being directed towards the one or more imaging sensors, a body of the person being directed towards the one or more imaging sensors, the face of the person making a desired facial expression, and eyes of the person being opened.

* * * * *